(12) United States Patent
Moosbrugger

(10) Patent No.: US 7,531,085 B2
(45) Date of Patent: May 12, 2009

(54) DEVICE FOR PURIFYING ANAEROBIC BIOLOGICAL WASTEWATER

(76) Inventor: Richard Moosbrugger, Kirchddorf 59, A-6874 Bizau (AT)

(*) Notice: Subject to any disclaimer, the term of this patent is extended or adjusted under 35 U.S.C. 154(b) by 0 days.

(21) Appl. No.: 11/917,504

(22) PCT Filed: May 13, 2006

(86) PCT No.: PCT/AT2006/000226

§ 371 (c)(1),
(2), (4) Date: Dec. 14, 2007

(87) PCT Pub. No.: WO2006/133467

PCT Pub. Date: Dec. 21, 2006

(65) Prior Publication Data

US 2008/0203003 A1    Aug. 28, 2008

(30) Foreign Application Priority Data

Jun. 16, 2005    (AT) ............................. A 1013/2005

(51) Int. Cl.
    C02F 3/00    (2006.01)
(52) U.S. Cl. .................... 210/136; 210/195.3; 210/196; 210/197; 210/188
(58) Field of Classification Search ................. 210/136, 210/195.3, 196, 197, 188
    See application file for complete search history.

(56) References Cited

U.S. PATENT DOCUMENTS 4,302,329 A    11/1981    Pfefferkorn et al.

FOREIGN PATENT DOCUMENTS

| DE | 3111888 A1 | 10/1982 |
|---|---|---|
| DE | 8211869.8 U1 | 10/1983 |
| DE | 3330696 A1 | 3/1985 |
| DE | 19815616 A1 | 10/1999 |
| EP | 0539430 B1 | 10/1994 |
| EP | 1251103 A2 * | 10/2002 |
| EP | 0170332 B1 | 4/2008 |
| WO | 0102309 A1 | 1/2001 |

* cited by examiner

Primary Examiner—Chester T Barry
(74) Attorney, Agent, or Firm—Barley Snyder LLC

(57) ABSTRACT

The invention relates to a device for purifying anaerobic biological wastewater, which wastewater is fed in through a feed pipe (4) and the purified wastewater and built-up gas are removed respectively by a discharge pipe (24) and a gas outlet pipe (18), said device comprising a main chamber (1), wherein wastewater, which is to be clarified, is fed to a lower area and at least one lifting pipe (9), which is used to remove the built-up gas and the purified wastewater, which contains sludge particles, emerges from an area which is higher than said lower area, said lifting pipe joining a return tank (2) in order to separate gas and purified wastewater, which contains sludge particles, and the outlet (11) thereof m the return tank (2) being higher than the inlet (10) thereof in the main chamber (1). The return tank (2) is connected to an auxiliary chamber (3), wherein purified wastewater, which contains sludge particles and which was lifted to the return tank (2) via the at least one lifting pipe (9), flows out from the return tank (2) to the auxiliary chamber (3). The purified wastewater flows off to the discharge pipe (24) from an upper region of the auxiliary chamber (3) and the auxiliary chamber (3) is connected in a lower region via a valve, preferably a non-return valve (15), or a pump to a lower region of the main chamber (1).

18 Claims, 2 Drawing Sheets

Fig. 1
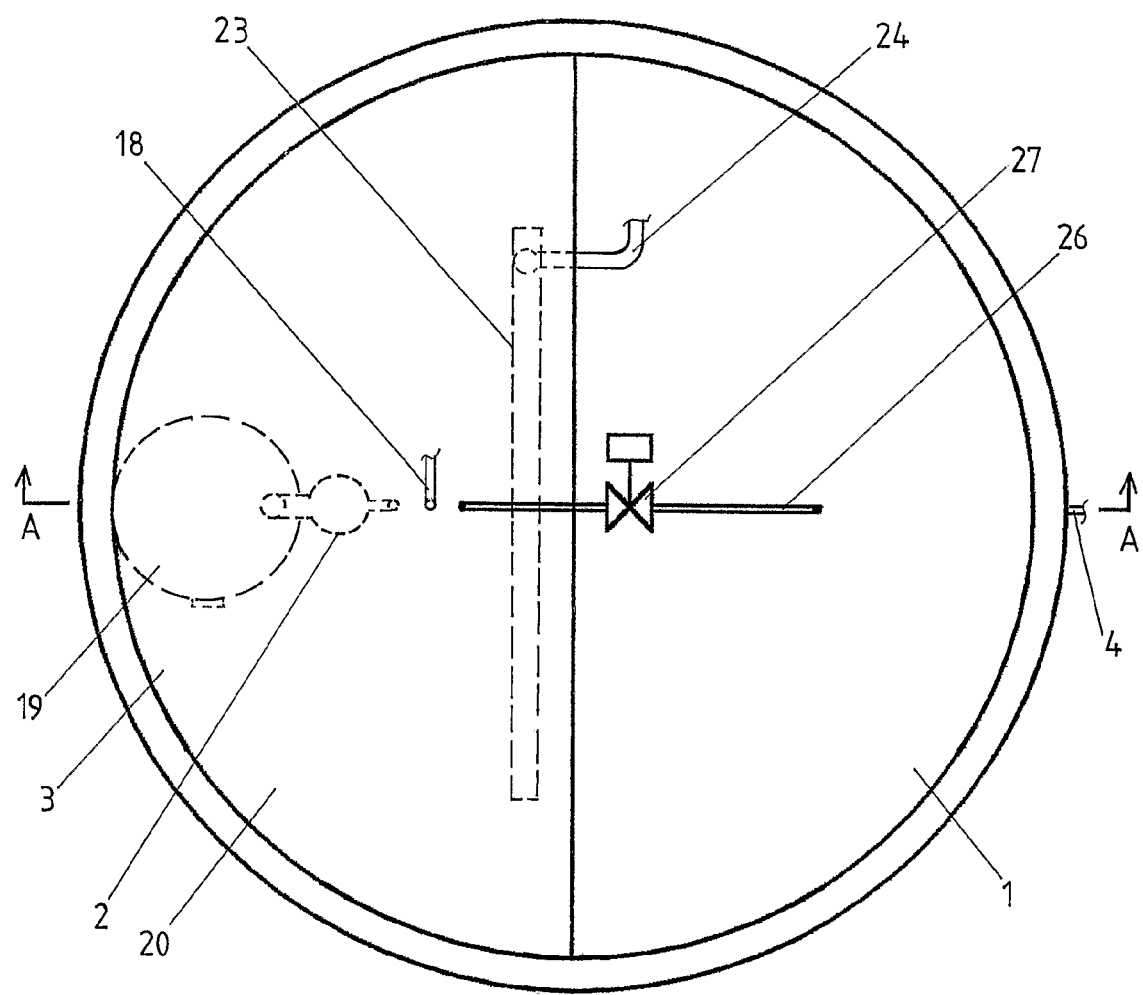
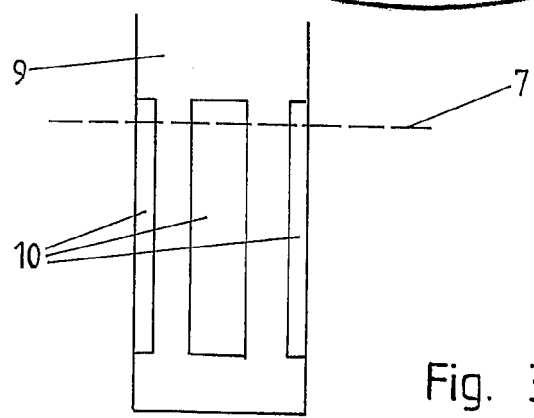
Fig. 3

DEVICE FOR PURIFYING ANAEROBIC BIOLOGICAL WASTEWATER

FIELD OF THE INVENTION

The invention relates to a device for purifying anaerobic biological wastewater, which wastewater is fed in through a feed pipe and the purified wastewater and the built-up gas are removed respectively by a discharge pipe and a gas outlet pipe, said device comprising a main chamber, wherein wastewater, which is to be clarified is fed to a lower area and at least one lifting pipe, which is used to remove the built-up gas and purified wastewater, which contains sludge particles, emerges from an area which is higher than said lower area, said lifting pipe joining a return tank in order to separate gas and purified wastewater, which contains sludge particles, and the outlet thereof in the return tank being higher than the inlet thereof in the main chamber.

BACKGROUND

Devices for purifying anaerobic biological wastewater are well known. Usually these consist of a single reactor chamber, into whose bottom area flows the wastewater, which is to be clarified. A sludge bed, which represents the biologically active zone for purifying the wastewater and through which the wastewater enters, is provided in a lower area of the reactor chamber. The wastewater is purified while flowing through the sludge bed, its organic content is reduced and biogas (essentially consisting of methane and carbon dioxide) is built-up. The built-up biogas rises through the sludge bed and the zone lying above it, is trapped by separator baffles and discharged to a gas outlet pipe. Above the separator baffles is a calming zone, whose purpose is to enable entrained biologically activated sludge particles to fall out and settle again. The purified wastewater is removed from the upper end of the calming zone.

Problems arise with this arrangement inter alia due to the accumulation of floating sludge below the separators. Also it is necessary to filter the exhausted air due to gases being released in the calming zone, since otherwise serious odour problems would arise. Furthermore uneven flows in the sludge bed can arise due to insufficient thorough mixing of the sludge bed, as a result of which the purifying efficiency of the plant is reduced.

Devices of the type initially specified are known from EP 0 170 332 A1 and EP 0 539 430 B1. Lifting pipes emerging from an area lying above the feed pipe for the wastewater (and above the sludge bed) and below the fluid level in the main chamber, to which rising gas trapped by separator baffles is fed, are provided here. Gas and wastewater, which has been purified but still contains sludge particles, are lifted through the at least one lifting pipe to a return tank by the pressure of the gas. Biogas and the entrained wastewater are separated in the return tank. The biogas is diverted to a gas outlet pipe and the wastewater together with the contained sludge particles flows back from the return tank through a return pipe to the main chamber, and to be precise to the bottom area of the same, where thorough mixing in the sludge bed takes place. Above the lifting pipes with the associated separator baffles is a calming zone and further separator baffles may be provided there if necessary. The purified wastewater flows out from the upper area of the main chamber. Also problems arise with this arrangement inter alia due to the accumulation of floating sludge in the separators and in the wastewater removal area, which entails high maintenance costs.

A distinction is to be made between devices for purifying wastewater and such for digesting sludge with a high organic content, which is biologically degradable, as occurring in agriculture or industry. Such sludge before treatment has 10-20% dry substance (after treatment correspondingly less, 5-6% for example). In the case of wastewater on the other hand the dry substance content is below 1%, normally in the range of 0.1%. Usually the devices for digesting sludge are not suitable for wastewater purification. Devices for digesting sludge are known for example from DE 32 11 888 A1, DE 82 11 869 U1 and U.S. Pat. No. 4,302,329 A.

The device known from DE 33 30 696 A1 is applicable both for digesting sludge and for purifying anaerobic wastewater. The main chamber, in which the main organic activity takes place, has lateral overflow outlets, which lead to a separating chamber surrounding the main chamber. On the outer edge of the separating chamber is an overflow channel, from which the discharge pipe for the treated substrate emerges. A current is created first downwards and then upwards by a partition wall, which is open at the bottom in the separating chamber. Organically activated sludge, which can be pumped back through a return pipe to the main chamber by means of a pump, settles at the bottom of the separating chamber. Also in the case of this device floating sludge accumulates in the main chamber and inside the separating chamber, as a result of which maintenance work is necessary. Furthermore retention of biologically activated sludge is not optimum. If an excessive amount of biologically activated sludge is shed, the biological activity in the main chamber however is reduced to an unacceptable degree.

SUMMARY

The object of the invention is to create a device of the type initially specified, wherein maintenance costs are low and the shedding of biologically activated sludge is effectively counteracted.

The auxiliary chamber, into which according to the invention the wastewater lifted to the return tank flows off, forms a calming zone for the wastewater, so that decantable biologically activated sludge can effectively settle. Floating sludge and other floating matter (particles containing oil for example) on the other hand can flow off together with the purified wastewater. The retained sludge, which has sunk to the bottom, can be returned again to the main chamber via the connection of the auxiliary chamber to the main chamber. A very effective, low-maintenance device is thus created.

A device according to the invention can be advantageously constructed without separators for separating gas. The calming zone conventionally found above the separators is not required in the case of a device according to the invention, since the biologically activated sludge settles in the auxiliary chamber. In an advantageous embodiment of the invention the main chamber is tightly sealed in the region above the inlet into the at least one lifting pipe and any pipe-work in this region joining the main chamber can be closed off by valves if necessary. In continuous operation therefore gas builds up in the region of the main chamber lying above the inlet of the at least one lifting pipe, as a result of which the fluid level stands in the region of the inlet of the at least one lifting pipe.

If the outlet for discharging the purified wastewater from the auxiliary chamber advantageously lies higher than the inlet into the at least one lifting pipe, preferably at least 2 meters higher, this leads to a pressure above atmospheric pressure of the gas lying in the upper region of the main chamber. This then creates a pump effect due to the gas flowing into the lifting pipe, as a consequence of which wastewater containing sludge particles is entrained.

BRIEF DESCRIPTION OF THE DRAWINGS

Further advantages and details of the invention are described below on the basis of the appended drawing, wherein:

FIG. 1 shows a schematic plan view onto a device in accordance with a preferred embodiment of the invention.

DETAILED DESCRIPTION OF THE EMBODIMENTS

Figure 2:
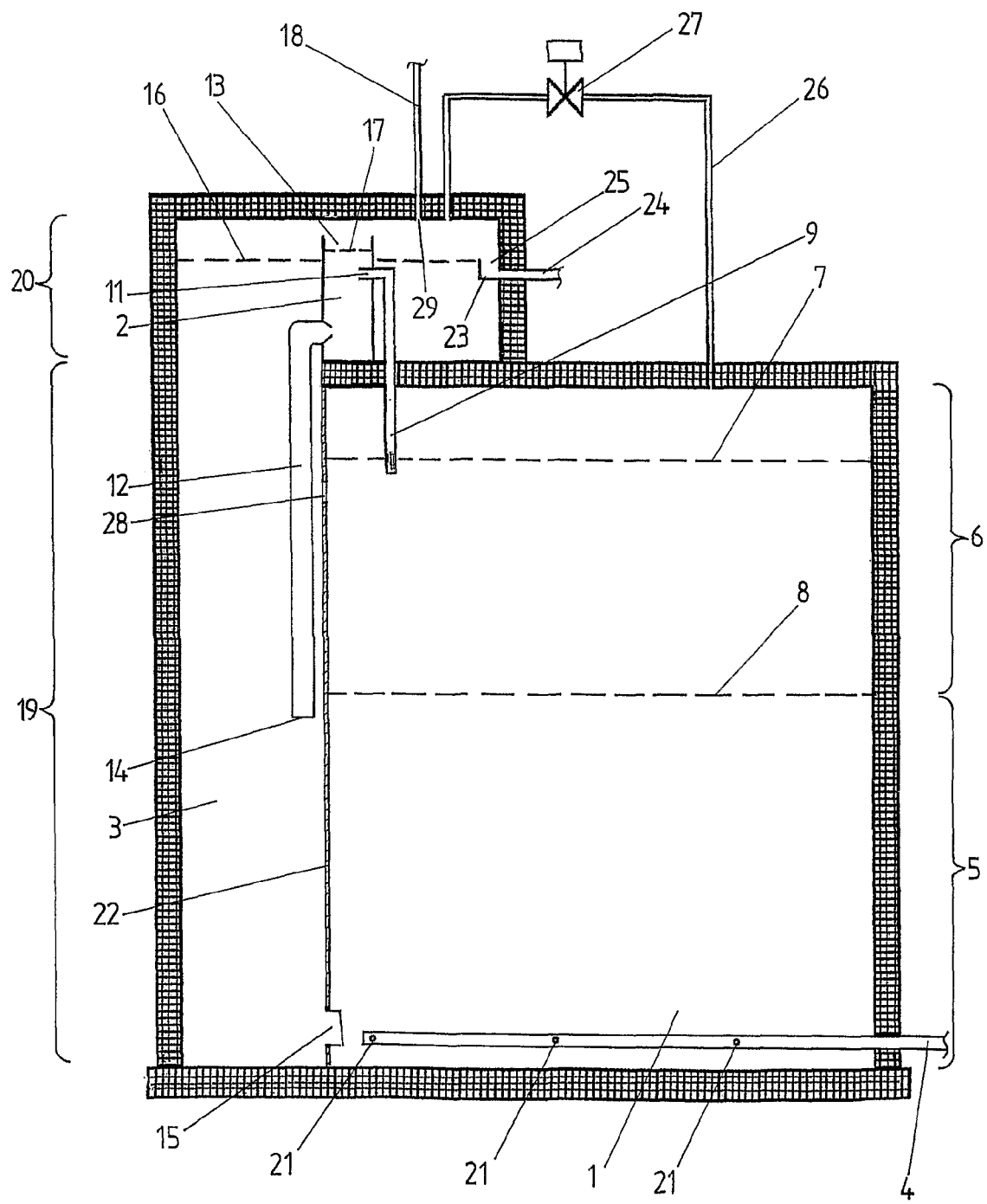
FIG. 2 a schematic cutaway section along pipe A-A of FIG. 1 and
FIG. 3 a detailed illustration in the region of the lower end of the lifting pipe.

The device in accordance with the invention, illustrated in the figures, has a reactor or main chamber 1, into whose lower area the feed pipe 4 for the wastewater, which is to be clarified, joins. The wastewater in all cases is fed into the lower quarter of the main chamber 1, a distance from the bottom of less than 1 meter being preferable. In the exemplary embodiment shown, the feed pipe 4 comprises several discharge openings 21. For example the feed pipe could also be formed by several branches routed separately into the main chamber 1.

A lower part of the main chamber 1 forms an active zone 5, which comprises a sludge bed (=fluidised bed), in which biologically activated sludge is present. The active zone 5 can also be formed as a so-called hard bed, which is constructed by piling up a filter medium with a bio film grown thereon and layers of biologically activated sludge in-between.

The majority of the biological activity and thus the main wastewater purification take place in this active zone 5. Organic and biologically degradable components contained in the wastewater are degraded while flowing through the active zone 5. At this point gas known as biogas, which rises from the active zone 5, is released.

Above the active zone 5 is a liquid and gas zone 6, the fluid level 7 standing during steady-state (continuous) operation being indicated by a broken line. Biogas, which has risen through the liquid, builds up above the fluid level 7.

The normally relatively sharp interface 8 between the active zone 5 and the liquid and gas zone 6 can alter, depending on the operating state, in the course of operation.

In the liquid and gas zone 6 below the fluid level 7 is purified wastewater, which however in particular still contains sludge particles. Sludge particles are entrained by the gas rising from the active zone 5. Apart from such particles, which may settle in a calm environment, normally there is still a component of buoyant substances, particles of floating sludge or fat particles for example.

A lifting pipe 9, which joins a return tank (return vessel) 2 extends from an area of the main chamber 1, lying higher relative to the region where the wastewater is fed into the main chamber 1, which is located above the active zone 5. This lifting pipe 9 here leads upwards to the return tank 2 starting from the main chamber 1, that is to say the inlet 10 into the lifting pipe 9 is deeper than the outlet 11 thereof in the return tank 2.

The inlet 10 into the lifting pipe 9 advantageously lies at a distance below the upper boundary wall of the main chamber, which is less than a quarter of the height of the main chamber.

A distance from the upper boundary wall of less than 15% of the height of the main chamber 1 is preferred.

The inlet 10 into the lifting pipe 9 in proximity to the lower end of the lifting pipe 9 comprises several slots, which in the exemplary embodiment shown represent window-like openings in the wall of the lifting pipe 9. Several slots are provided at a distance from each other in the circumferential direction. Furthermore the lower end of the lifting pipe 9 is of open construction. Closed construction of the lower end is conceivable and possible.

Preferably the return tank 2 lies entirely above the main chamber 1, as shown in FIG. 2.

Gas and purified wastewater, which contains sludge particles reaches the return tank 2 though the lifting pipe 9, as yet to be described further below. Wastewater, which contains particles, and gas are separated in the return tank 2. Gas passes out from the return tank 2 through a gas outlet 13, which in the exemplary embodiment shown is formed by the open upper end of the return tank 2, and enters the auxiliary chamber 3.

The purified wastewater, which contains sludge particles, flows through the return pipe 12 leading from the return tank 2 to the auxiliary chamber 3. The return pipe 12 here is routed from the return tank 2 preferably at a place, which is deeper than the outlet 11 of the lifting pipe 9. The mouth 14 of the return pipe 12 preferably lies deeper than the place, at which it leaves the return tank 2. In the exemplary embodiment shown this mouth 14 points downwards.

The auxiliary chamber 3 is connected in a lower area to the main chamber 1 with a valve, which is in the form of a non-return valve 15 in the partition wall 22 between the auxiliary chamber 3 and the main chamber 1. Preferably this connection is less than 1 meter above the bottom of the auxiliary chamber 3 or the main chamber 1.

The purified wastewater is removed from an upper region of the auxiliary chamber 3, and to be precise in the exemplary embodiment shown there is an upwardly open discharge spout 23, from which the discharge pipe 24 for the purified wastewater leads. The outlet 25 for the purified wastewater from the auxiliary chamber 3 is thus formed by the opening of the discharge spout 23.

The fluid level 16 standing in the auxiliary chamber 3 during steady-state operation is represented by a broken line. In contrast to this the fluid level 17 in the return tank 2 may be slightly higher (due to hydrodynamic effects).

Biogas, which flows in from the return tank 2 builds up above the fluid levels 16, 17 and can also build up to a lesser degree in the auxiliary chamber 3 itself. Instead of the auxiliary chamber 3, which lies higher than the outlet 25 for the purified wastewater, there is an outlet 29 for the biogas to discharge this into the gas outlet pipe 18. Preferably the built up biogas is converted into energy. A gas flare is conceivable and possible.

In the auxiliary chamber 3 decantable biologically activated sludge particles can settle and flow back again through the non-return valve 15 to the main chamber, so that biologically activated sludge is not wasted if possible. Floatable particles on the other hand are removed by the discharge pipe 24, so that floating sludge is prevented from accumulating.

The auxiliary chamber 3 comprises an influx section 19, which the return pipe 12 joins and an expansion section 20 lying above it, whose horizontal cross-sectional area is substantially larger, preferably more than three times as large as the horizontal cross-sectional area of the influx section 19. A calmed zone is already present in the influx section 19, whose purpose is to decant the sludge particles entrained by the wastewater, which has been fed-in. In contrast to this the upwardly directed current however can still entrain lighter, decantable sludge particles. Further calming takes places in the expansion section 20, so that these sludge particles can also settle. Biologically activated sludge settling on the bottom of the expansion section 20 is returned by back flushing described further below. For executing such back flushing, a connecting pipe 26, wherein an open- and closable stop valve is arranged, leaves the upper region of the auxiliary chamber 3 and joins the upper end of the main chamber 1 (it is also conceivable and possible for it to join the gas outlet pipe 18, which leaves the upper region of the auxiliary chamber 3).

Preferably there is also a connection between the main chamber 1 and the auxiliary chamber 3, which joins the main chamber 1 with the auxiliary chamber 3 in a region, which lies above half the height of the main chamber 1 and above the active zone 1, but below the inlet 10 into the lifting pipe 9. This connection could be formed by a pipe. In the exemplary embodiment shown it is formed by an opening 28 in the partition wall 22 between the main chamber 1 and the auxiliary chamber 3. The cross-section of this opening 28 is smaller than the cross-section of the opened non-return valve 15.

When the plant is started up there is still no biogas initially and the fluid level 7 in the main chamber 1 stands at the upper end of the main chamber 1. The stop valve 27 is closed. The main chamber 1 is therefore tightly sealed in the region above the inlet 10 into the lifting pipe 9. The fluid level 7 falls due to the formation of biogas, which rises, as the result of which liquid flows initially through the opening 28 out of the main chamber 1 to the auxiliary chamber 3. As soon as the fluid level 7 has reached the inlet into the lifting pipe 9, gas flows into the lifting pipe 9. Here this gas is under a pressure, which depending on the liquid column corresponds to the height difference between the fluid level 16 in the auxiliary chamber 3 and the fluid level 7 in the main chamber 1. This gas flowing into the lifting pipe 9 therefore entrains liquid and also any particles contained therein. This gas lifting effect thus acts as a kind of pump, whereby liquid and particles contained therein are also pumped to the return tank 2 (pumps, which work on this principle, are known as "air-lift" or "injector pumps" for example).

Due to the pump effect of the gas flowing through the lifting pipe 9 (depending on the operating state) more liquid can be taken via the return tank 2 to the auxiliary chamber 3 than wastewater through the feed pipe 4 of the main chamber 1. In steady-state continuous operation a quantity of purified wastewater corresponding to the supply of wastewater is removed through the discharge pipe 24. Surplus liquid therefore flows back through the non-return valve 15 and to a lesser degree through the opening 28 (since its cross-sectional opening is smaller) to the main chamber 1, thereby entraining sludge particles that have settled in the auxiliary chamber, which in this way again flow back to the main chamber 1 through the non-return valve 15.

It would also be conceivable and possible, in order to connect the lower area of the auxiliary chamber 3 to the main chamber 1, to provide a pipe equipped with a pump. If sludge, which has settled in the auxiliary chamber 3, is to be returned to the main chamber 1, this pump is switched on.

For executing back flushing the stop valve 27 is opened. The fluid level 16 in the auxiliary chamber 3 falls as a consequence and the fluid level 7 in the main chamber rises, until these are at the same level. Thereby a corresponding quantity of liquid flows through the non-return valve 15 of the auxiliary chamber 3 to the main chamber 1. Thorough mixing of the sludge bed in the main chamber 1 is thus achieved. Furthermore sludge, which has settled in the auxiliary chamber 3, is returned to the main chamber 1. Sludge, which has settled in the expansion section 20, is back-flushed to the influx section 19 of the auxiliary chamber 3.

The connection between the main chamber 1 and the auxiliary chamber 3, formed by the opening 28 in the exemplary embodiment shown, could also be dispensed with. After back flushing however no gas would flow initially through the gas outlet pipe 18. Due to the presence of the opening 28 the flow of gas is thus more balanced.

In place of the upwardly open construction of the return tank 2 extending above the height of the outlet 25 for the purified wastewater, the gas outlet 13 of the return tank 2 could also lead to a pipe, through which gas is directly fed to the gas outlet pipe 18.

The non-return valve 15 instead of its arrangement in the partition wall 22 could also be provided in a connecting pipe joining the lower area of the auxiliary chamber 3 with the lower area of the main chamber 1. In lieu of a non-return valve 15 an open- and closable stop valve could also be provided in the partition wall 22 or in a connecting pipe between the auxiliary chamber 3 and the main chamber 1.

Also several lifting pipes 9 could be provided, which all join the same vessels forming the return tank 2 or into different subsidiary vessels, which together form the return tank 2.

It would also be conceivable and possible for the auxiliary chamber 3 to comprise several single chambers.

| Key to the reference symbols: | |
|---|---|
| 1 | main chamber |
| 2 | return tank |
| 3 | auxiliary chamber |
| 4 | feed pipe |
| 5 | active zone |
| 6 | liquid and gas zone |
| 7 | fluid level |
| 8 | interface |
| 9 | lifting pipe |
| 10 | inlet |
| 11 | outlet |
| 12 | return pipe |
| 13 | gas outlet |
| 14 | mouth |
| 15 | non-return valve |
| 16 | fluid level |
| 17 | fluid level |
| 18 | gas outlet pipe |
| 19 | influx section |
| 20 | expansion section |
| 21 | discharge opening |
| 22 | partition wall |
| 23 | discharge spout |
| 24 | discharge pipe |
| 25 | outlet |
| 26 | connecting pipe |
| 27 | stop valve |
| 28 | opening |
| 29 | outlet |

The invention claimed is:

1. An anaerobic biological wastewater purification device, receiving wastewater through a feed pipe discharging purified wastewater through a discharge pipe and discharging built-up gas through a gas outlet pipe, said device comprising:

a main chamber, having a lower area into which wastewater is fed;

at least one lifting pipe through which built-up gas and purified wastewater which contains sludge particles, emerges from an area which is higher than said lower area;

a return tank joined to said main chamber by said lifting pipe having an outlet thereof in the return tank being higher than an inlet thereof in the main chamber;

an auxiliary chamber in communication with the return tank, the auxiliary chamber having an upper region and a lower region, said lower region being connected to the main chamber;

wherein purified wastewater, which contains sludge particles and which was lifted to the return tank via the at least one lifting pipe, flows out from the return tank to the auxiliary chamber, and wherein purified wastewater flows away to the discharge pipe from the upper region of the auxiliary chamber.

2. The device according to claim 1 wherein the auxiliary chamber is connected in a lower region by a valve.

3. The device according to claim 1 wherein the auxiliary chamber is connected in a lower region by a pump.

4. The device according to claim 1, wherein the auxiliary chamber, in an area lying above an outlet for the purified wastewater, has an outlet for discharging gas into the gas outlet pipe.

5. The device according to claim 4 wherein the return tank extends above the height, at which the outlet for discharging the purified wastewater from the auxiliary chamber extends upwards.

6. The device according to claim 1 wherein the return tank lies entirely above the main chamber.

7. The device according to claim 4 wherein the return tank has a gas outlet, which lies above the height of the outlet of the at least one lifting pipe and above the height of the outlet for discharging the purified wastewater from the auxiliary chamber, whereby gas flows from the return tank to the auxiliary chamber or to a branch of the gas outlet pipe.

8. The device according to claim 1 wherein the inlet into the at least one lifting pipe lies at a distance below the upper boundary wall of the main chamber, which is less than a quarter of the height of the main chamber.

9. The device according to claim 1 wherein a lower quarter of the main chamber, in the region of less than 1 meter above the bottom of the main chamber, receives wastewater, which is to be clarified.

10. The device according to claim 1 wherein the connection of the return tank to the auxiliary chamber starts from a place of the return tank, which is correspondingly deeper than the outlet of the at least one lifting pipe into the return tank.

11. The device according to claim 1 wherein in order to connect the return tank to the auxiliary chamber a return pipe leaves the return tank and joins the auxiliary chamber two thirds below the height of the auxiliary chamber, wherein the mouth into the auxiliary chamber lies deeper than the place, at which the return pipe leaves the return tank.

12. The device according to claim 4 wherein a connecting pipe is provided between the main chamber and the auxiliary chamber, running between an area of the main chamber, lying higher than the inlet into the at least one lifting pipe, and an area of the auxiliary chamber, lying higher than the outlet for discharging the purified wastewater from the auxiliary chamber, and wherein an open and closable stop valve is arranged.

13. The device according to claim 1 wherein the auxiliary chamber comprises an expansion section above an influx section, which has a larger horizontal cross-sectional area of more than three times as large as that of the influx section.

14. The device according to claim 13 wherein the influx section extends above the height of the main chamber.

15. The device according to claim 1 wherein a further connection is provided between the main chamber and the auxiliary chamber, which joins the main chamber with the auxiliary chamber in the area of the upper half of the main chamber, but below the inlet into the at least one lifting pipe the further connection being formed by an opening in a partition wall between the main chamber and the auxiliary chamber.

16. The device according to claim 15 wherein the opening cross-section of the further connection is smaller than the opening cross-section of the connection between the lower area of the auxiliary chamber and the lower area of the main chamber.

17. The device according to claim 1 wherein the main chamber in the region above the inlet into the at least one lifting pipe is tightly sealed.

18. The device according to claim 1 wherein the outlet for the purified wastewater from the auxiliary chamber lies at least 2 meters higher than the inlet into the at least one lifting pipe.

* * * * *